United States Patent
Kanan

[11] Patent Number: 6,039,136
[45] Date of Patent: Mar. 21, 2000

[54] FLOATATION COMPONENT FOR A SUSPENSION SYSTEM FOR A SNOWMOBILE

[76] Inventor: Ronald C. Kanan, 917 E. Hyman, Aspen, Colo. 81611

[21] Appl. No.: 08/979,753

[22] Filed: Nov. 26, 1997

[51] Int. Cl.[7] .................................................. B62M 27/00
[52] U.S. Cl. ............................................................. 180/182
[58] Field of Search ..................................... 180/182, 183, 180/184, 185

[56] References Cited

U.S. PATENT DOCUMENTS

| | | | |
|---|---|---|---|
| 871,907 | 11/1907 | Bertram . | |
| 2,735,690 | 2/1956 | Paden et al. ............................. | 280/900 |
| 3,482,849 | 12/1969 | Puetz . | |
| 3,645,347 | 2/1972 | Brant ....................................... | 180/182 |
| 3,719,369 | 3/1973 | Savage . | |
| 4,291,892 | 9/1981 | Berthold et al. ........................... | 280/28 |
| 4,390,151 | 6/1983 | Schneider ................................. | 280/28 |
| 4,393,953 | 7/1983 | Boulianne .............................. | 280/900 |
| 4,620,604 | 11/1986 | Talbot ..................................... | 180/190 |
| 4,671,521 | 6/1987 | Talbot et al. ............................ | 180/190 |
| 5,109,941 | 5/1992 | Thompson . | |

*Primary Examiner*—Kevin Hurley
*Attorney, Agent, or Firm*—Holland & Hart LLP

[57] ABSTRACT

An improved suspension mechanism for a snowmobile comprising a set of primary skis and a set of auxiliary skis whereby the first auxiliary ski is secured to a strut and linkage bracket assembly that operatively connects the snowmobile chassis to the snowmobile's first primary ski, and the second auxiliary ski is secured to a strut and linkage bracket assembly that operatively connects the snowmobile chassis to the snowmobile's second primary ski. The auxiliary skis provide an improved suspension mechanism to support and stabilize the snowmobile when the snowmobile is in deeper snow conditions.

17 Claims, 4 Drawing Sheets

FLOATATION COMPONENT FOR A SUSPENSION SYSTEM FOR A SNOWMOBILE

FIELD OF THE INVENTION

The present invention relates to the field of suspension systems for snow vehicles. More particularly, the invention relates to an improved floatation component of the suspension system for a snowmobile, which results in improved performance and handling in deep snow.

BACKGROUND OF THE INVENTION

Snowmobiles have been a mode of transportation across snow for decades. Over the years there have been numerous general configurations for snowmobiles. Generally, a snowmobile comprises a tread on the rear part of the snowmobile which is driven by some type of engine, and two skis on the front of the snowmobile which support the front end of the snowmobile as well as provide steering for the snowmobile. The tread rotates around a series of suspension wheels and grips the snow thereby pushing the snowmobile in a forward or rearward direction. The tread acts in a similar manner to treads on a tank. The front of the snowmobile is supported by a pair of skis. There have been single ski snowmobiles, but the typical snowmobile has two skis. The skis generally are linked to a suspension system which absorbs the impact when a ski hits a hard surface, thus making the snowmobile more comfortable to ride and easier to handle. This type of snowmobile is generally shown in U.S. Pat. No. 5,109,941.

The front skis also provide steering for the snowmobile. The skis are secured through a variety of mechanical couplings to a handlebar which is gripped by the user. As the user turns the handlebar in one direction, the skis point in that direction and thus turn the snowmobile in that direction.

Oftentimes snowmobiling is done in very deep snow, which presents many problems to existing snowmobiles. The first problem is that even though the front skis lift the front of the snowmobile off the snow, in deep powder the front of the snowmobile can get bogged down. One reason for this is that snow packs into the suspension wells of the snowmobile when riding in deep powder, thus increasing front end resistance. This resistance causes the snowmobile to slow down or even become stuck. Another reason for the snowmobile getting stuck is that the front end of the snowmobile may simply sink in the deep snow, regardless of the increased resistance.

Attempts have been made to correct this problem by widening the front skis. An example of this is shown in U.S. Pat. No. 3,482,849. This is undesirable in that the steering precision can decrease as the skis are widened.

An additional problem with existing snowmobiles is that as they are driven in the deep snow, the steerability of the snowmobile diminishes significantly. This diminishment of steerability results from the front skis being buried in deep snow, and not being the sole point of contact between the front of the snowmobile and the snow. Rather, the bottom of the front of the snowmobile resists turning because it too is buried in deep snow.

There exists a need for a snowmobile to have additional support in deep snow that allows the snowmobile to maintain ideal speeds in deep snow.

It is with these shortcomings in mind that the present invention was developed.

SUMMARY OF THE INVENTION

The present invention is embodied in an additional component of a suspension system for a snowmobile. The present invention utilizes two additional skis secured below the front carriage or cowling of the snowmobile. The additional skis assist the performance of the snowmobile in deep snow. The invention includes two or more individually mounted skis which during normal operation of the snowmobile across a flat packed snow surface, do not engage the snow surface. However, upon encountering deep snow, the additional skis assist in preventing snow from packing into the suspension wells of the snowmobile. The skis also support, and provide lift to, the front chassis of the snowmobile and allow the snowmobile to go through deep snow, while maintaining sufficient force on the front two primary skis to provide steerability of the snowmobile. The suspension mechanism of the present invention provides additional support to the front cowling of the snowmobile so it does not get stuck in deep powder.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENT

Snowmobile suspension systems are ideally designed to provide suspension for the snowmobile across flat or lightly packed snow surfaces. However, typical suspension systems for snowmobiles do not adequately handle deep powder. The present invention is directed to a modification of presently available snowmobile suspension system such that travel through deep powder may be possible with greatly reduced disruption to the speed or steerability of the machine. Suspension, as used throughout, includes not only the moving linkages for absorbing shocks and steering, but also for supporting the front of the snowmobile on the snow. This includes the standard skis and the inventive floatation skis described herein.

Figure 1:
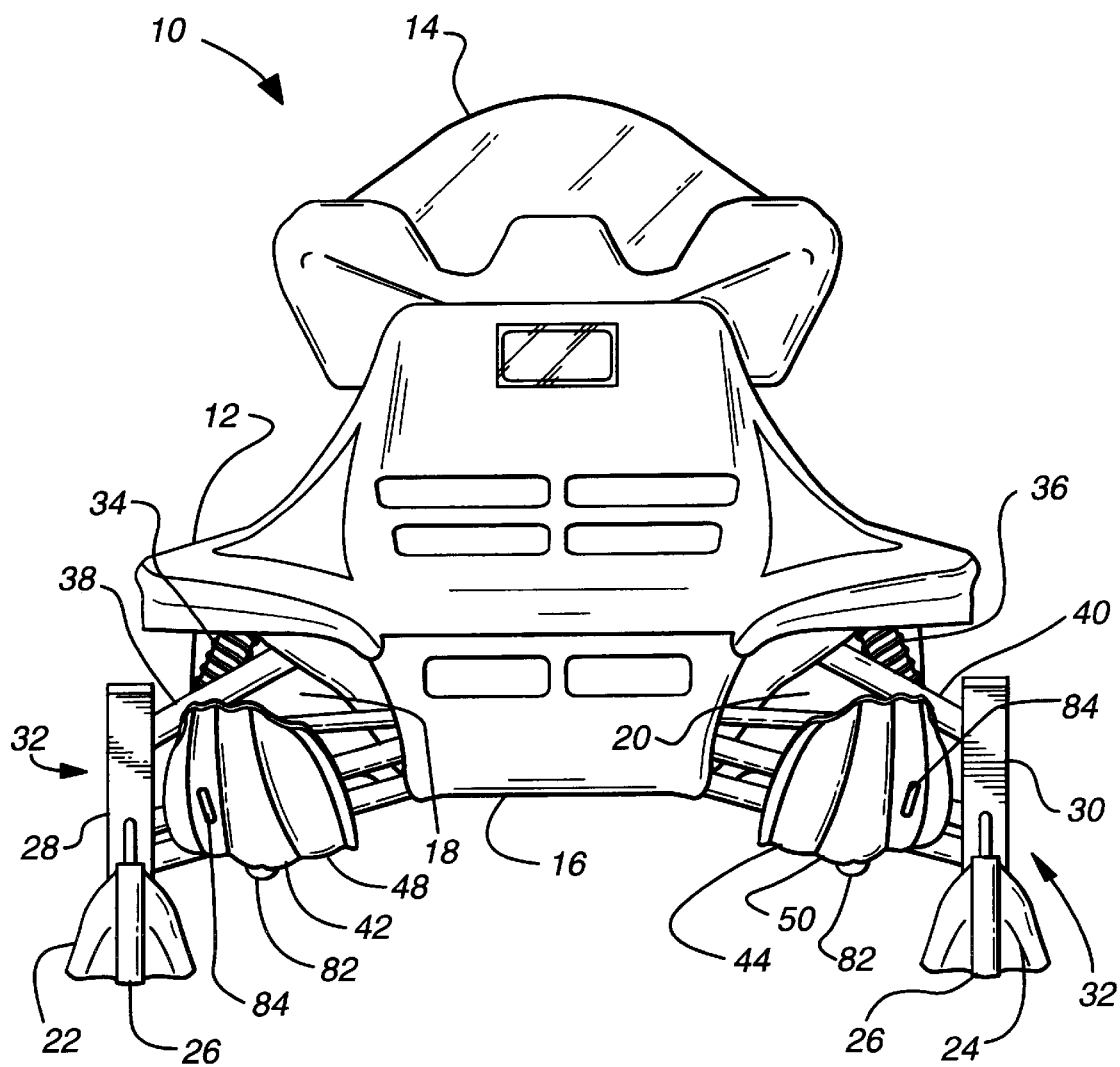
FIG. 1 is a front view of a snowmobile utilizing the floatation components of the suspension mechanism of the present invention.

A snowmobile viewed from the front end is generally shown as 10 in FIG. 1. Snowmobile 10 has a front cowling 12 which provides a variety of functions. The cowling 12 acts as a hood to cover the engine. The cowling 12 also provides wind resistance to the riders as they are moving forward on the snowmobile. The cowling 12 also may provide support for lights, reflectors, and add to the overall styling of the snowmobile 10. The type or shape of the cowling 12 for the present invention is immaterial as far as the present invention is concerned. The cowling 12 is typically made of a stiff, durable polymeric or composite material.

Situated at the top of the cowling 12 is a windshield 14, which provides both wind resistance and safety to the driver of the snowmobile. The windshield 14 also is positioned in front of the handlebars (not pictured), which provide the steering control for the snowmobile 10. The windshield is typically a transparent shatterproof type of acrylic material.

The bottom 16 of the cowling 12 is a primary contact point where the snowmobile 10 might become bogged down in deep snow. Additionally, deep snow may also be compacted in the suspension wells, which are generally shown as 18 and 20 in FIG. 1.

Typical skis for present snowmobiles are shown as 22 and 24. These skis 22 and 24 are attached to the handlebars and provide steerability for the snowmobile 10, as well as support for the front end of the snowmobile 10 on the snow. The primary skis 22 and 24 are usually ribbed in a linear fashion to increase the handling characteristics of the snowmobile 10. Oftentimes the primary skis 22 and 24 include carbide runners 26 along their length to protect the bottoms from hard surfaces, such as rocks, pavement or the like. The skis 22 and 24 are secured to linkage brackets 28 and 30 respectively. The skis 22 and 24 as well as the linkage brackets 28 and 30 are generally referred to as 32. The linkage brackets 28 and 30 are secured to the shock-absorbing suspension of the snowmobile 10, which is partially shown as 34 and 36.

The suspension system shown in the attached drawings is just one example of a suspension system that could be used for the present invention. The type of suspension system used for the primary skis (22 and 24) of the present invention is not a limiting factor, and any type of suspension system which provides some type of flex, absorption, and steering for the main (primary) skis is envisioned for the present invention. The shock-absorbing suspension system may include coiled springs, hydraulic pistons and cylinders, leaf springs, or any other type of system which provides flex and/or impact absorption to a ski.

Struts 38 and 40 secure skis 22 and 24 and linkage brackets 28 and 30 to the main chassis of the snowmobile 10. The number of struts, as well as the angle and thickness of the struts is immaterial to the present invention, and a single example is merely shown in the enclosed figures for illustrative purposes only.

Skis 42 and 44 provide the benefits of the present invention described herein. These skis 42 and 44 (also called "auxiliary skis" herein) improve the snowmobile's performance by providing two functions. The first function is to prevent or reduce the amount of snow packing in the wells 18 and 20. As snowmobile 10 travels across deep powder, snow tends to get packed in the suspension wells 18 and 20 of the snowmobile. As the snow fills the wells 18 and 20, and as the snowmobile 10 continues to travel through the powder, the packed wells 18 and 20 provide increased resistance to the movement of the snowmobile 10 through the powder. This increased resistance slows down the snowmobile 10 in the deep powder. Additionally, the responsiveness of the steering of the snowmobile 10 diminishes due to increased drag of the snowmobile 10 through the powder. The increased drag reduces performance and can cause the snowmobile to bog down or become completely stuck.

As can be seen by the location and size of skis 42 and 44, the skis 42 and 44 are positioned to prevent snow from entering the suspension wells 18 and 20 of the snowmobile 10. When the snow hits the front upraised portions 46 of skis 42 and 44, the snow is either deflected, or compressed downward, thus allowing the snowmobile 10 to pass on top of the snow. The end result of this action is that the snow does not pack into the wells 18 and 20 of the snowmobile 10.

The second function is that skis 42 and 44 create additional lift to help the snowmobile stay on top of the deep snow, thus minimizing slow-down of the snowmobile. The auxiliary skis 42 and 44 effectively increase the surface area of the front end of the snowmobile in contact with deep snow, and thus helps better support the front end above the surface of the snow. The surface engaging portions 48 and 50 of the auxiliary skis 42 and 44 are in a plane above the primary skis 22 and 24, and thus do not contact the snow surface except when in deep snow.

Figure 2:
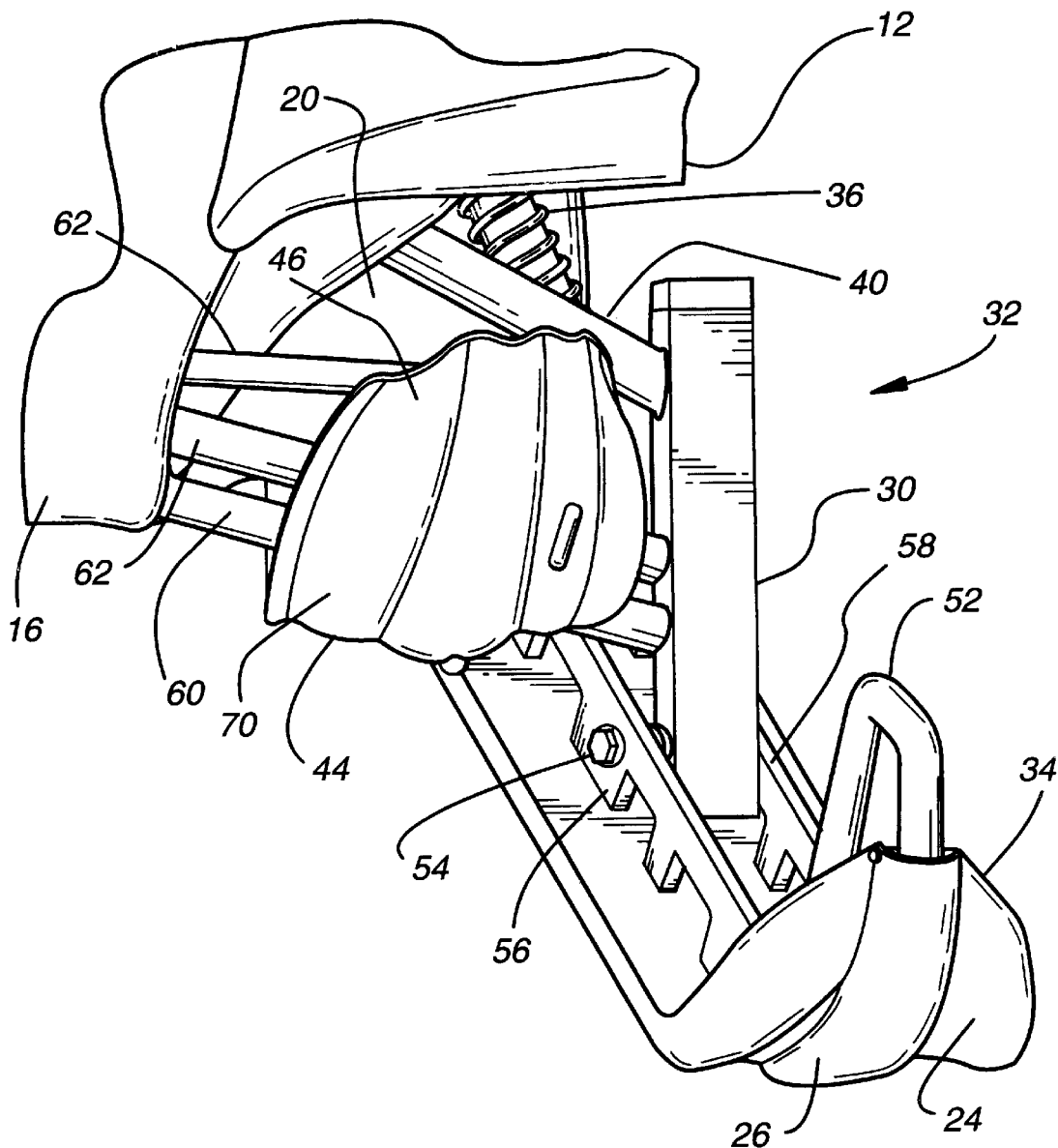
FIG. 2 is a close-up of the left auxiliary ski of the present invention.

FIG. 2 is an isolated view of the front left side of the snowmobile 10 shown in FIG. 1. Ski 24 is shown with a handle projecting as 52. This handle 52 is provided such that the user of the snowmobile 10 may pull or position the front of the snowmobile or maneuver it if the snowmobile is off or idling. Linkage 30 is shown secured to ski 24 by bolt 54. This linkage 30 is secured to the ski 24 through brackets 56 and 58. These brackets are typical brackets found on primary skis of snowmobiles and function as an extension from ski 24 which acts as a retaining bracket such that linkage 30 may be secured to ski 24 using bolt 54. The specifics of how primary ski 24 is secured to snowmobile 10 is not critical to the present invention. The term "primary ski" is meant to denote the skis (22 and 24) mounted on the front of the snowmobile which act to steer and support the snowmobile 10. There can be numerous mechanisms whereby the ski 24 is secured to a snowmobile 10.

Strut 40 is also shown in a preferred position for a strut. However, as discussed above, the strut and suspension system for the skis 22 and 24 disclosed herein are merely one example of virtually hundreds of different types of strut and suspension systems that could be used with the present invention. Additional struts 60 and 62 are part of the suspension system for attaching and supporting the ski 24 on the snowmobile, as well as being part of the steering linkage between the handlebars and the primary ski 24. These struts can be in any of a variety of configurations, and the auxiliary ski 44 of the present invention is mountable on these various configurations.

Figure 3:
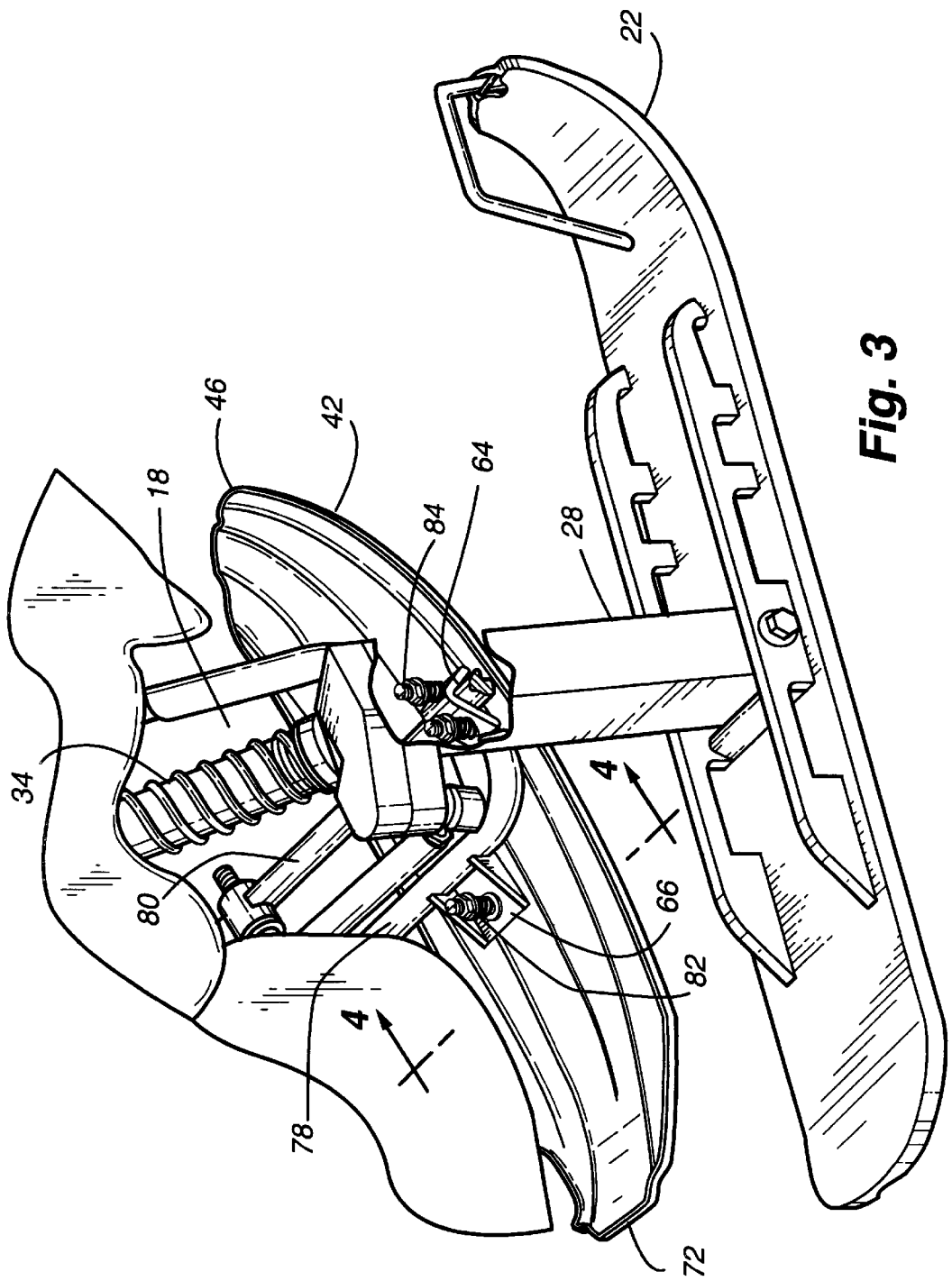
FIG. 3 is a rear side view of the right auxiliary ski of the present invention.
Figure 4:
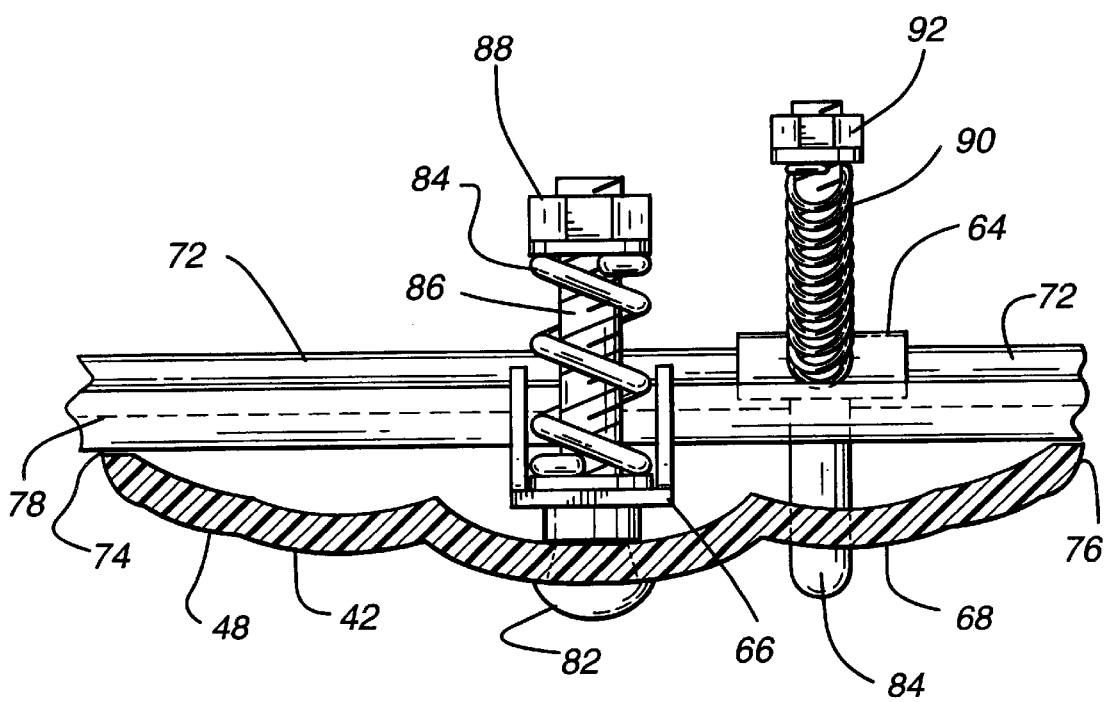
FIG. 4 is a section taken along lines 4 in FIG. 3.

The auxiliary ski 44 of the present invention is shown mounted to the suspension 32 by two mounting brackets 64 and 66. These are more clearly shown in FIGS. 3 and 4. FIGS. 3 and 4 show auxiliary ski 42, which is identical to ski 44, except that it is on the opposite side of the snowmobile. The structure and connections for both skis 42 and 44 are identical or at least closely similar. The position of the skis 42 and 44 are ideally situated such that as the skis 42 and 44 curve upwardly, the width and upward projection covers the majority (more than about 50%) of the area of the entrance of the front suspension well shown generally as 18 (in FIG. 3). Additionally, the plane of the bottom 68 and 70 of the skis 42 and 44, respectively, should be lower than the plane defined by the bottom 16 of cowling 12 of snowmobile 10. The bottom plane of skis 42 and 44 must be higher than the bottom plane of skis 22 and 24. Thus, preferably, the distance between the bottom of the plane of skis 22 and 24 and the bottom of the plane of skis 42 and 44 is approximately five to fifteen centimeters. Additionally, the bottom plane of ski 42 and the bottom plane of ski 44 should be approximately in the horizontal plane to approximately 30° above the horizontal plane. This is measured from the portion of the ski having the flattest longitudinal profile, such as near the tail 72 as opposed to the tip 46 of the auxiliary ski 42. The auxiliary ski 42 has a generally flat longitudinal profile with a curved-up tip 46 and possibly a curved-up tail 72. In width cross-section, as shown in FIG. 4, the ski has a ribbed, curvilinear arcuate shape, sloping upwardly at the longitudinally opposing edges 74 and 76. The other auxiliary ski 44 is similarly formed. Part of either auxiliary ski can be removed or cut out so as to not interfere with the exhaust system of the particular snowmobile.

FIG. 3 discloses a detailed close-up of the invention described herein. Ski 42 is basically secured to strut members 78 and 80 by two different securing means. In the preferred embodiment, it is shown that carriage bolt 82 and U-bolt 84 secure ski 42 to the struts 78 and 80 respectively, as is described in more detail below. These struts have dual purpose, in that they support ski 22 as well as ski 42.

An important aspect of the present invention is that the auxiliary ski may be added to a snowmobile in an after market sale in a kit form. This kit form takes the form of a pair of skis, as well as a securing means which secure the skis to existing struts or other components of the snowmobile. Thus, the present invention may be secured to the snowmobile by the original snowmobile manufacturer, or may be added onto existing snowmobiles as an after market item. It is anticipated that different brands of snowmobiles have different strut and suspension systems for the main skis, thus the after market kits may have to be adapted to individual brands and/or models of snowmobiles.

FIG. 3 discloses an embodiment of the present invention wherein carriage bolt 82 is secured to strut 78 through bracket 66. Bracket 66 is a flange which has been welded to strut 78. As an alternative, carriage bolt 82 could extend through an aperture in strut 78, thus not requiring bracket 66. As shown in FIGS. 3 and 4, a spring 85 (FIG. 4) surrounds the shank 86 of the carriage bolt 82, and butts against the bracket 66 and the end fastener 88. The spring biases the carriage bolt in an upwardly direction with respect to the bracket 66 so that the ski 42 is movably held against the member 78 to which it is attached. The spring 85 structure allows the ski to be moved downwardly and away from the member 78 under adequate force (such as by a foot or hand). This allows snow and ice that incidentally forms on the ski 42 to be removed, and also gives the ski 42 some flexibility so as to not break or improperly bend. In normal circumstances, the ski 42 is biased in a position against the member 78.

Other means of securing the carriage bolt 82 or other fastening means to the struts of the snowmobile are envisioned, and the type of securement to the strut or snowmobile is not limiting, however, the spring-loaded mounting is preferred. The carriage bolt 82 is merely shown as one example of a securing or fastening means which secures the ski 42 to a strut or chassis of a snowmobile. Other types of bolts, welds, or linking mechanism may be used. Additionally, the ski does not need to be fastened to a strut but could be fastened to the chassis or the shock absorber or other frame part of the snowmobile. By being fastened to a part of the suspension, however, the auxiliary ski 42 moves up and down with the primary ski. The other ski 44 is held on similarly at its rear end to the snowmobile.

Ski 42 is likewise preferably also secured to a second strut 80 of snowmobile 10 through U-bolt 84. U-bolt 84 extends through the bottom of the ski 42 and is secured around strut 80. As the U-bolt 84 is positioned at the front 46 of the ski 42, the bottom of U-bolt 84 is shown in FIG. 1. The intended purpose of securing ski 42 in two different positions along the ski 42 is to provide adequate support to the ski 42 such that there is minimal movement and minimal flex of the ski 42 during use, other than what is intended by the fastening means. A single connecting point could be used, but preferably two or more locations of the auxiliary ski are secured to a strut or chassis component of the snowmobile 10.

FIG. 4 is a close-up of the preferred securing means shown in FIG. 3 taken along lines 4—4 in FIG. 3. This figure illustrates bolts 82 and 84 secured to a cross-section of ski 42. One-half of U-bolt 84 is shown with spring 90 positioned between the bracket 64 and end fastener 92. The purpose of spring 90 is to allow some movement to ski 42. If ski 42 is pushed in a downward direction for whatever reason, U-bolt 84 will move in a downward direction, thus allowing the ski 42 to move downwardly a short distance. This downward movement may be necessary as ski 42 is propelled through deep powder, applying different forces at the front and back of the ski 42. The spring 90 keeps the ski biased upwardly in a position against or adjacent the member 80. The movement of the ski allowed by this structure is similar to the spring structure on the rear attachment point with bolt 82. Some movement is preferred in that the ski 42 may break or rip off the strut 80 if movement is not allowed. Again, this is preferred such that the ski 42 does not tear away from the strut 80. As discussed above, ski 42 may be secured to a strut or chassis portion of the snowmobile 10 through a single securing means or a plurality of securing means. As shown, the two attachment points for each ski 42 and 44 are spaced laterally and longitudinally apart for added stability of the ski to resist torsional forces. The two attachment points could be in-line both latitudinally and longitudinally and function adequately, but the lateral and longitudinal spacing is preferred. Additionally, the skis 42 and 44 may comprise a plurality of skis, thus there may be two, four or more skis which provide the benefits of the present invention.

The preferred packaging and sale of the invention is in a kit form for after market sale. Thus, a kit with the two or more auxiliary skis would be sold with some type of fastening or securing means. Different kits would be needed for different snowmobiles. Finally, just the skis could be sold in a kit, and the user could install the skis using common hardware components.

Additionally, if the additional skis of the present invention are part of the original equipment on the snowmobile, a separate strut suspension system may be designed for the skis. Again, the type of strut, the type of securing means, or the type of suspension is not limited because of the invention. The present invention is directed to the use of two or more skis which assist the snowmobile in propulsion and floatation through deep powder.

While the invention has been particularly shown and described with reference to a preferred embodiment thereof, it will be understood by those skilled in the art that various other changes in the form and details may be made without departing from the spirit and scope of the invention. A presently preferred embodiment of the snowmobile suspension invention and many of its improvements have been described with a degree of particularity. It should be understood that this description has been made by way of example, and that the suspension invention is defined by the scope of the following claims.

We claim:

1. An improved suspension for a snowmobile, said suspension comprising:
   a. a first and second primary ski, said first and second primary ski supporting a front end of said snowmobile, said first and second primary ski being steerably connected to means for steering said snowmobile, said first and second skis having a first bottom horizontal plane which contacts the ground when said snowmobile is at rest;
   b. a first strut operatively connected between a first chassis point of said snowmobile and said first primary ski;
   c. a second strut operatively connected between a second chassis point of said snowmobile and said second primary ski;

d. a first and second auxiliary ski, said first auxiliary ski secured to said first strut of said first primary ski and said second auxiliary ski secured to said second strut of said second primary ski, said first and second auxiliary skis having a second bottom horizontal plane which is higher than said first horizontal plane such that said auxiliary skis do not contact the ground when said snowmobile is at rest on a flat surface.

2. The suspension of claim 1 wherein there are an additional third and fourth struts linkably connected to said first and second primary skis respectively.

3. The suspension of claim 2 wherein said first auxiliary ski is secured to said third strut of said first primary ski at a second point of attachment on said first auxiliary ski and said second auxiliary ski is secured to said fourth strut of said second primary ski at a second point of attachment on said second auxiliary ski.

4. The suspension of claim 1 wherein said first strut is operatively linked to said first primary ski by a first linkage and said second strut is operatively linked to said second primary ski by a second linkage.

5. The suspension of claim 1 wherein said first strut is operatively linked to said first chassis point by a third linkage and wherein said second strut is operatively linked to said second chassis point by a fourth linkage.

6. The suspension of claim 1 wherein said auxiliary skis are wider than said primary skis.

7. The suspension of claim 1 wherein said first horizontal plane is about 5–15 centimeters lower than said second horizontal plane.

8. The suspension of claim 1 wherein said securement of said first and second auxiliary ski have a means for shock absorption such that said first and second auxiliary skis may move in an upward direction upon deflection.

9. The suspension of claim 1 wherein said first and second auxiliary skis are positioned in front of a first and second suspension well of said snowmobile such that as said snowmobile moves through snow, said snow is deflected substantially away from said suspension wells.

10. An improved suspension for a snowmobile, said suspension comprising:

a. a first and second primary ski, said first and second primary ski supporting a front end of said snowmobile, said first and second primary ski being steerably connected to means for steering said snowmobile, said first and second skis having a first bottom horizontal plane which contacts the ground when said snowmobile is at rest;

b. a first and second strut operatively connected between a first and second chassis point of said snowmobile and said first primary ski;

c. a third and fourth strut operatively connected between a third and fourth chassis point of said snowmobile and said second primary ski; and d. a first and second auxiliary ski, said first and second auxiliary skis being wider than said first and second primary skis, said first auxiliary ski operatively secured to said first and second struts of said first primary ski and said second auxiliary ski operatively secured to said third and fourth struts of said second primary ski, said first and second auxiliary ski having a second bottom horizontal plane which is about 5–15 centimeters higher that said primary ski's first horizontal plane such that said auxiliary skis do not contact the ground when said snowmobile is at rest on a flat surface.

11. A kit to be used in conjunction with a snowmobile, the snowmobile including a first and second primary ski, the first and second skis defining a first bottom horizontal plane which contacts the ground when said snowmobile is at rest, and a first strut linkage assembly operatively connected between a first chassis point of the snowmobile and the first primary ski, a second strut linkage assembly operatively connected between a second chassis point of the snowmobile and the second primary ski; said kit comprising:

a. a first and second auxiliary ski; and b. a first means for mounting said first auxiliary ski at a first strut mounting position to said first strut of said first primary ski and a second means for mounting said second auxiliary ski at a second strut mounting position to said second strut of said second primary ski, said first and second mounting means positioned such that said first and second auxiliary skis have a second bottom horizontal plane which is higher that said primary ski's first horizontal plane such that said auxiliary skis do not contact the ground when said snowmobile is at rest on a flat surface.

12. The kit of claim 11 wherein the snowmobile comprises an additional third and fourth struts linkably connected to said first and second primary skis respectively.

13. The kit of claim 12 wherein said first means for mounting has a component to secure said third strut of said first primary ski at a second point of attachment on said first auxiliary ski and said second means for mounting has a component to secure said fourth strut of said second primary ski at a second point of attachment on said second auxiliary ski.

14. The kit of claim 11 wherein said auxiliary skis are wider than said primary skis.

15. The kit of claim 11 wherein said first horizontal plane is about 5–15 centimeters lower than said second horizontal plane.

16. The kit of claim 11 wherein said first and second means for mounting said first and second auxiliary skis have a means for shock absorption such that said first and second auxiliary skis may move in an upward direction upon deflection.

17. The kit of claim 11 wherein said first and second means for mounting said first and second auxiliary skis positions said skis on said first and second struts in front of a first and second suspension well of said snowmobile such that as said snowmobile moves through snow, said snow is deflected away from said suspension wells.

* * * * *